United States Patent
Kraning et al.

(10) Patent No.: US 10,831,838 B2
(45) Date of Patent: *Nov. 10, 2020

(54) TRIGGERED SCANNING BASED ON NETWORK AVAILABLE DATA CHANGE

(71) Applicant: Expanse, Inc., San Francisco, CA (US)

(72) Inventors: Matthew Kraning, San Francisco, CA (US); Timothy Junio, San Francisco, CA (US)

(73) Assignee: EXPANSE, INC., San Francisco, CA (US)

( * ) Notice: Subject to any disclaimer, the term of this patent is extended or adjusted under 35 U.S.C. 154(b) by 467 days.

This patent is subject to a terminal disclaimer.

(21) Appl. No.: 15/463,990

(22) Filed: Mar. 20, 2017

(65) Prior Publication Data
US 2018/0268058 A1   Sep. 20, 2018

(51) Int. Cl.
  *G06F 16/951*  (2019.01)
  *G06F 16/958*  (2019.01)
  *G06F 16/2455* (2019.01)

(52) U.S. Cl.
  CPC ...... *G06F 16/951* (2019.01); *G06F 16/24565* (2019.01); *G06F 16/958* (2019.01)

(58) Field of Classification Search
  None
  See application file for complete search history.

(56) References Cited

U.S. PATENT DOCUMENTS

| | | | | |
|---|---|---|---|---|
| 6,088,804 A * | 7/2000 | Hill | ............ | G06F 21/552 726/25 |
| 8,966,625 B1 * | 2/2015 | Zuk | ............ | H04L 63/145 709/227 |
| 9,009,834 B1 | 4/2015 | Ren | | |
| 9,749,336 B1 * | 8/2017 | Zhang | ............ | H04L 63/14 |
| 2002/0157021 A1 | 10/2002 | Sorkin | | |
| 2003/0097588 A1 * | 5/2003 | Fischman | ............ | H04L 63/1416 726/25 |
| 2005/0010821 A1 | 1/2005 | Cooper | | |
| 2006/0291446 A1 | 12/2006 | Caldwell | | |
| 2009/0249482 A1 | 10/2009 | Sarathy | | |
| 2011/0277034 A1 * | 11/2011 | Hanson | ............ | H04L 63/1433 726/25 |
| 2013/0028259 A1 * | 1/2013 | Cohen | ............ | H04L 63/1408 370/392 |
| 2014/0047546 A1 | 2/2014 | Sidagni | | |
| 2014/0157370 A1 | 6/2014 | Plattner et al. | | |
| 2014/0181975 A1 | 6/2014 | Spernow | | |
| 2015/0261955 A1 | 9/2015 | Huang | | |
| 2016/0044054 A1 * | 2/2016 | Stiansen | ............ | H04L 63/1416 726/24 |
| 2016/0057101 A1 | 2/2016 | Hugard, IV | | |
| 2016/0248800 A1 | 8/2016 | Ng | | |
| 2017/0310699 A1 * | 10/2017 | Gilbert | ............ | H04L 63/1433 |

OTHER PUBLICATIONS

Chai Jiwen et al, "Cyber security vulnerability assessment for Smart substations": IEEE 2016, 6 pages.*

* cited by examiner

*Primary Examiner* — Uyen T Le
(74) *Attorney, Agent, or Firm* — Perkins Coie LLP; Michael A. Glenn

(57) ABSTRACT

A system for an event driven query includes an input interface and a processor. The input interface is configured to receive an indication from an external system. The processor is configured to determine a scanning query based at least in part on the indication; and perform the scanning query.

19 Claims, 7 Drawing Sheets

TRIGGERED SCANNING BASED ON NETWORK AVAILABLE DATA CHANGE

BACKGROUND OF THE INVENTION

Internet connected assets (e.g., computers, mobile devices, server systems, client systems, internet-of-things devices, etc.) comprise computing systems in communication with the Internet. Internet connected assets commonly include one or more publicly addressable communication ports, allowing any internet connected device to query the asset. Some devices allow a range of connection types (e.g., hypertext transfer protocol (HTTP) connections, secure hypertext transfer protocol (HTTPS) connections, file transfer protocol (FTP) connections, secure file transfer protocol (FTPS) connections, telnet connections, secure shell (SSH) connections, etc.) over the one or more publicly accessible ports. Internet connected assets can comprise a wide range of different types of hardware devices running a wide range of software including a wide range of configuration options, creating a myriad of possibilities for security vulnerabilities. A typical systems administrator may not be aware of every detail of every system under his or her watch, creating a problem where system vulnerabilities may go undetected and unfixed. When a system change occurs (e.g., a system change indicated by network available data), it can be difficult for the system administrator to have full confidence that there are no vulnerabilities (e.g., that a system fix succeeded in fixing all vulnerabilities, that a system change did not create new vulnerabilities, that a newly discovered vulnerability is not relevant, etc.).

BRIEF DESCRIPTION OF THE DRAWINGS

Various embodiments of the invention are disclosed in the following detailed description and the accompanying drawings.

DETAILED DESCRIPTION

Figure 1:
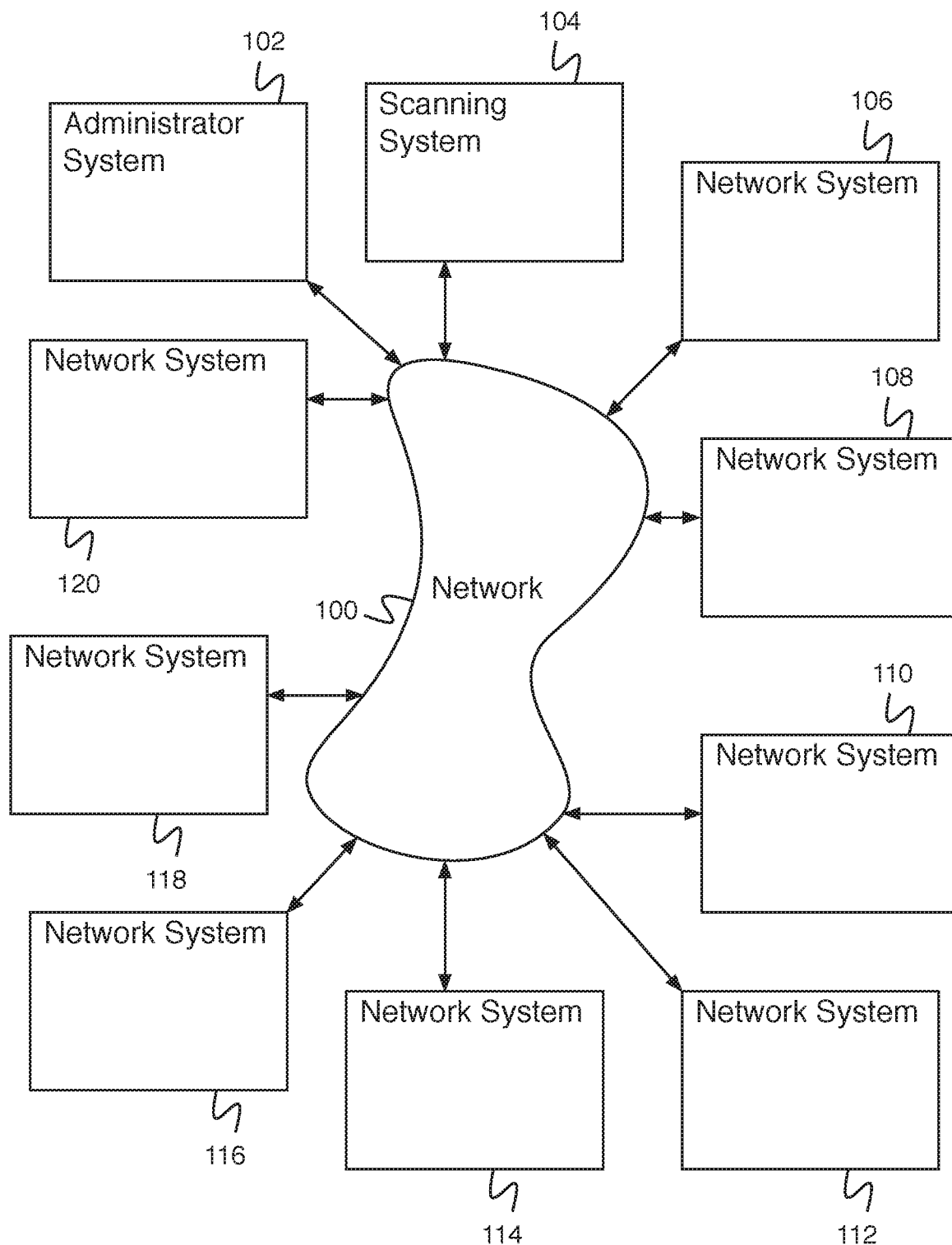
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for an event driven query comprises an input interface to receive an indication from an external system, and a processor to determine a scanning query based at least in part on the indication and perform the scanning query. In some embodiments, the system for an event driven query comprises a memory coupled to the processor and configured to provide the processor with instructions.

In some embodiments, a system for an event driven query comprises a system for performing a scan in response to an indication from an external system. In some embodiments, an indication from an external system comprises an indication of a change. In various embodiments, an indication from an external system comprises a manually determined indication, an automatic indication, an indication of a vulnerability, an indication determined from a published news story, an indication determined from an Internet posting, a public release or disclosure of a 'zero-day' vulnerability or severe threat for existing operating code, a limited private release or disclosure of a 'zero-day' vulnerability or severe threat for existing operating code, an indication of a border gateway protocol (BGP) route change, an indication of a domain name system (DNS) change, an indication of an internet protocol (IP) address change, an indication of a Regional Internet Registry (RIR) change, and indication of a company merger, acquisition, or divestiture, an indication of a changed system, an indication of a changed service, or any other appropriate indication. In some embodiments, the system for an event driven query receives the indication from the external system and determines a scanning query based at least in part on the indication. In some embodiments, determining a scanning query based at least in part on the indication comprises determining a scan indicated by the indication (e.g., comprising an address, a port on the address, and a scan type to use). In some embodiments, determining a scanning query based at least in part on the indication comprises expanding the scanning query (e.g., determining additional addresses, ports, and/or scan types). The system for an event driven query then performs the scan. In some embodiments, the system for an event driven query provides a network status display. In various embodiments, the network status display comprises historical properly configured systems (e.g., systems known to be properly configured before the indication was received), historical vulnerabilities, properly configured systems determined from the scan, vulnerabilities determined from the scan, or any other appropriate network status display information.

FIG. 1 is a block diagram illustrating an embodiment of a network system. In the example shown, the network system comprises a system for scanning of Internet connected assets. The network system includes network 100. In various embodiments, network 100 comprises one or more of the following: a local area network, a wide area network, a wired network, a wireless network, the Internet, an intranet, a storage area network, or any other appropriate communication network. Administrator system 102 and scanning system 104 communicate via network 100. Administrator system 102 comprises a system for an administrator. In various embodiments, administrator system 102 comprises a system for an administrator to access applications on an application system, to access data on a database system, to indicate to scanning system 104 to perform a scan, to receive data from scanning system 104, to configure a network system (e.g., network system 106), to receive data from a network system, or for any other appropriate purpose. In some embodiments, administrator system 102 comprises an administrator system for a client system. In various embodiments, a client system comprises a system requesting a scan (e.g., from scanning system 104), a network system associated with a system requesting a scan, an administrator system (e.g., administrator system 102), or any other appropriate client system. In some embodiments, administrator system 102 comprises a processor and a memory.

Scanning system 104 comprises a system for scanning network systems. In some embodiments, scanning system 104 comprises a system for scanning network systems in response to a command from administrator system 102. In some embodiments, scanning system 104 comprises a system for scanning a set of network systems (e.g. network system 106, network system 108, network system 110, network system 112, network system 114, network system 116, network system 118, and network system 120). In some embodiments, scanning a network system comprises providing a payload to the network system and determining whether a response is received. In some embodiments, scanning a network system comprises scanning the network system using a follow-up probe based at least in part on a received response. In some embodiments, scanning system 104 comprises a system for providing a payload to all accessible network systems on all accessible ports and following up with an appropriate follow-up probe for any received responses that indicate more information is accessible. In some embodiments, scanning system 104 comprises a processor and a memory. Each network system of FIG. 1 (e.g., network system 106) comprises an Internet connected system (e.g., a desktop computer, a laptop computer, a smartphone, a tablet computer, a server system, an internet-of-things device, etc.). In some embodiments, a network system comprises an external system. In some embodiments, an external system comprises a network system not part of a client system. In various embodiments, the system of FIG. 1 comprises 8, 13, 197, 2222, one million, one hundred million, or any other appropriate number of network systems.

Figure 2:
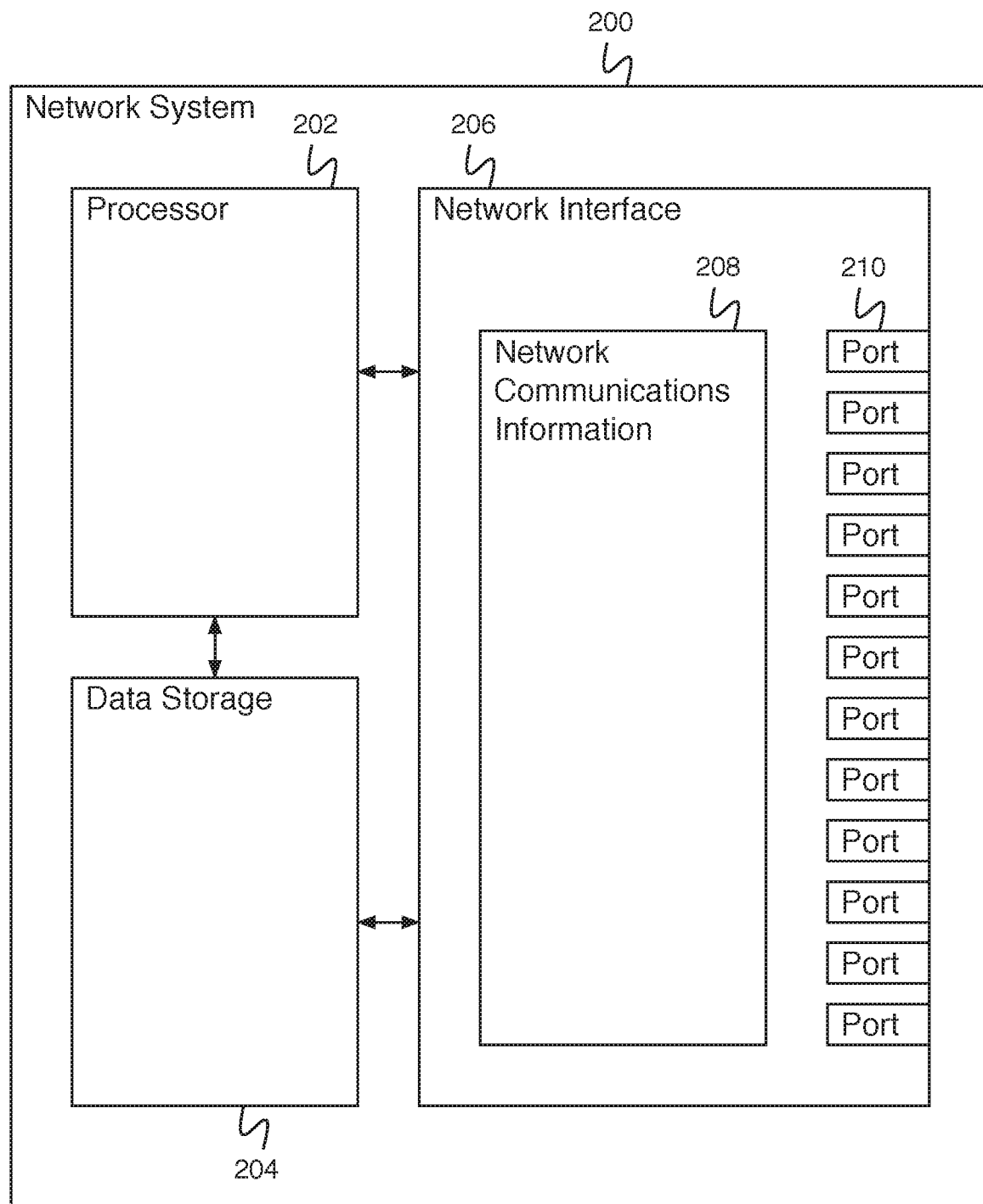
FIG. 2 is a block diagram illustrating an embodiment of a network system.

FIG. 2 is a block diagram illustrating an embodiment of a network system. In some embodiments, network system 200 comprises a network system of FIG. 1 (e.g., network system 106). In the example shown, network system 200 comprises processor 202, data storage 204, and network interface 206. In some embodiments, network system 200 comprises an Internet connected asset (e.g., a desktop computer, a laptop computer, a smartphone, a tablet computer, a server system, an internet-of-things device, or any other appropriate Internet connected asset). In various embodiments, processor 202 comprises a processor for executing instructions, processing data, responding to commands, etc. In various embodiments, processor 202 comprises a general-purpose processor, a microcontroller, a parallel processing system, a cluster of processors, or any other appropriate processor. In various embodiments, data storage 204 comprises a data storage for storing data, for storing instructions for processor 202, for storing configuration information, or for storing any other appropriate information. In various embodiments, data storage 204 comprises one or more of a volatile memory, a non-volatile memory, a magnetic memory, an optical memory, a phase-change memory, a semiconductor memory, a disc memory, a tape memory, or any other appropriate memory. Network interface 206 comprises a network interface for communicating with a network. In the example shown, network interface 206 comprises network communications information 208 and a plurality of ports (e.g., port 210). In various embodiments, network communications information comprises network communications software, network communications settings, network communications data, or any other appropriate network communications information. The plurality of ports comprises physical ports (e.g., plugs for connecting cables to network system 200) or virtual ports (e.g., virtual communications channels identified by a virtual port number). In some embodiments, network interface 206 comprises a network address (e.g., a network address assigned by an external network addressing authority). In some embodiments, communication with network system 200 is specified by indicating the network address of network 200 along with a port number. In some embodiments, some ports of network interface 206 are configured for communication and some are configured to not respond to communication. In some embodiments, some ports are associated with one or more specific communications protocols (e.g., HTTP, FTP, SSH, etc.). In some embodiments, network interface 206 comprises a set of network hardware (e.g., a modem) running a set of communications software that has been configured according to a set of communications specifications.

Figure 3:
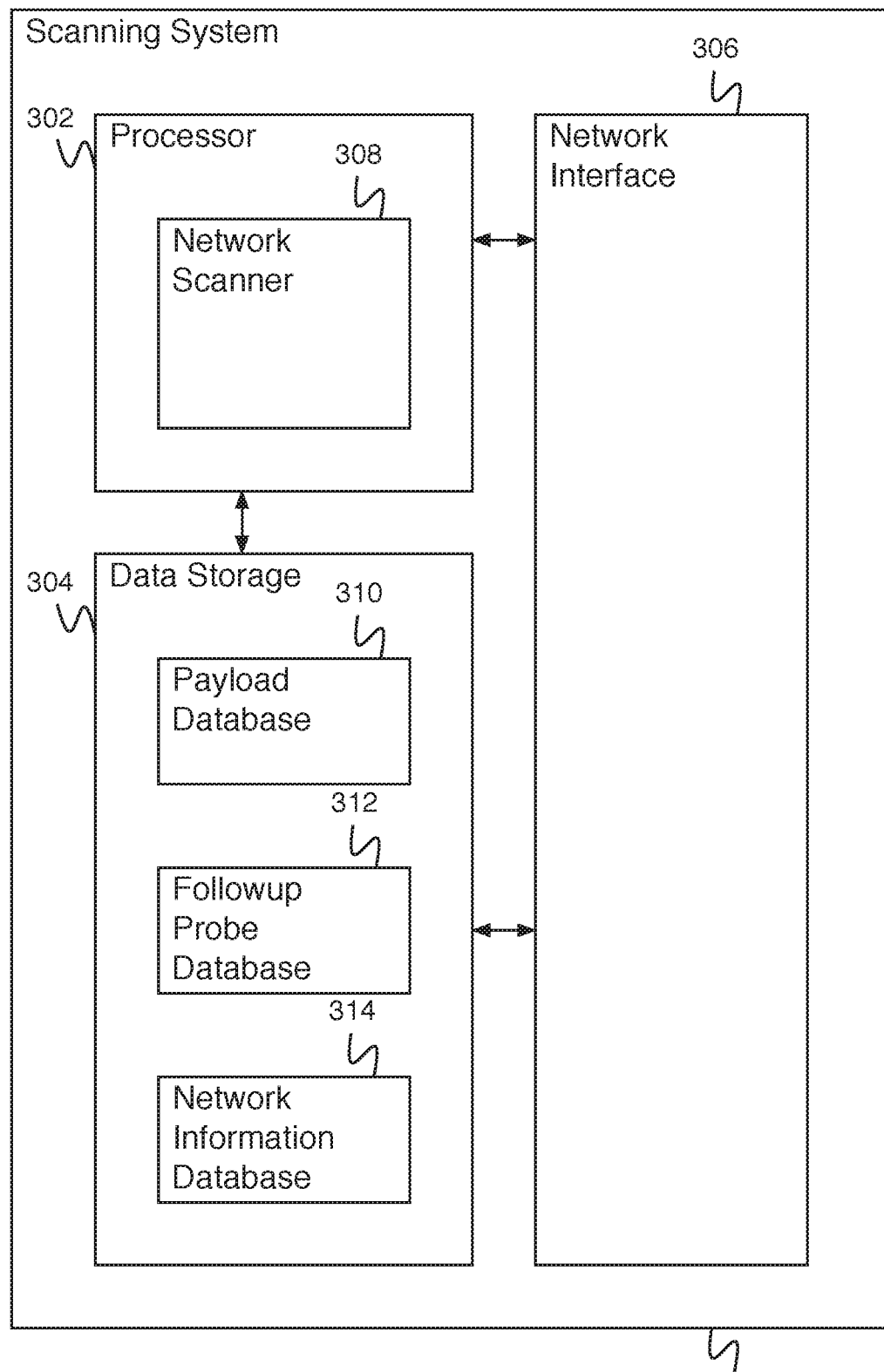
FIG. 3 is a block diagram illustrating an embodiment of a scanning system.

FIG. 3 is a block diagram illustrating an embodiment of a scanning system. In some embodiments, scanning system 300 comprises scanning system 104 of FIG. 1. In some embodiments, scanning system 300 comprises a server system. In the example shown, scanning system 300 comprises processor 302, data storage 304, and network interface 306. In various embodiments, processor 302 comprises a processor for executing instructions, processing data, responding to commands, etc. In various embodiments, processor 302 comprises a general-purpose processor, a microcontroller, a parallel processing system, a cluster of processors, or any other appropriate processor. In some embodiments, processor 302 comprises network scanner 308. In various embodiments, network scanner 308 comprises software and/or hardware implementing hierarchical scanning system functionality. In various embodiments, data storage 304 comprises a data storage for storing data, for storing instructions for processor 302, for storing configuration information, or for storing any other appropriate information. In various embodiments, data storage 304 comprises one or more of a volatile memory, a non-volatile memory, a magnetic memory, an optical memory, a phase-change memory, a semiconductor memory, a disc memory, a tape memory, or any other appropriate memory. In the example shown, data storage 304 comprises payload database 310 for storing payloads for providing to network devices. In some embodiments, a payload comprises a small data packet for probing a network device in order to elicit a response. Data storage 304 additionally comprises follow-up probe database 312 for storing follow-up probes for interacting with network devices. In some embodiments, a follow-up probe comprises software for interacting with a network device in order to determine information about the network device. In some embodiments, follow-up probe database 312 comprises a set of follow-up probes, each designed to interact with a network device in a specific way to retrieve data about the network device (e.g., establish a secure HTTP (HTTPS) connection and download an encrypted web page). In some embodiments, a follow-up probe is used to interact with a network device once it is determined that the follow-up probe is likely to succeed in receiving data from the network device. Data storage 304 additionally comprises network information database 314 for storing network information received as a result of interacting with network devices (e.g., using a payload or a follow-up probe). In some embodiments, network information is stored remotely (e.g., on a storage server, on a different hierarchical scanning system, on cloud storage, etc.). In the example shown, network interface 306 comprises a network interface for interacting with remote systems via a network. In various embodiments, network interface 306 comprises a network interface for providing a payload, for executing communications for a follow-up probe, for receiving network information, or for any other appropriate purpose. In some embodiments, network interface 306 comprises a network interface configured for high bandwidth communication.

Figure 4:
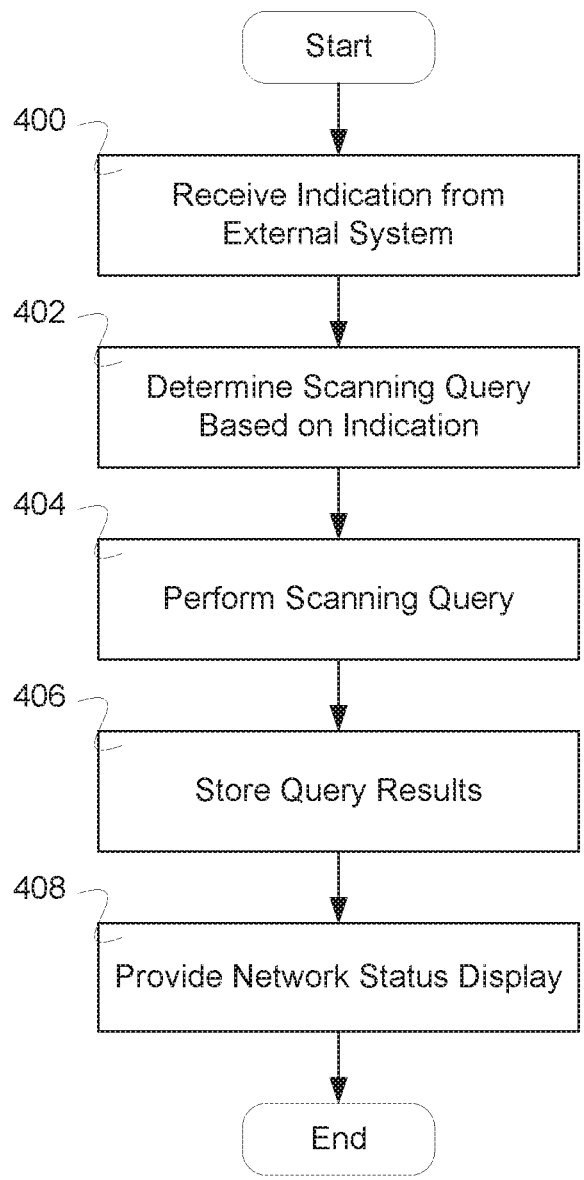
FIG. 4 is a flow diagram illustrating an embodiment of a process for triggered scanning.

FIG. 4 is a flow diagram illustrating an embodiment of a process for triggered scanning. In some embodiments, the process of FIG. 4 is executed by scanning system 104 of FIG. 1. In the example shown, in 400, an indication is received from an external system. In some embodiments, the indication comprises an indication of a change. In some embodiments, an indication received from an external system comprises a manually determined indication (e.g., an indication determined and initiated by a person). In various embodiments, a manually determined indication comprises an indication of a vulnerability, an indication determined from a published news story, an indication determined from an Internet posting, or any other appropriate indication. In various embodiments, a manually determined indication comprises an indication manually determined by a scanning system user, an administrator system user, an external system user, a network system user, or any other appropriate system user. In some embodiments, an indication received from an external system comprises an automatic indication (e.g., an indication determined by an automatic process from external system information). In various embodiments, an automatic indication comprises an indication of a border gateway protocol (e.g., BGP) route change, an indication of a domain name server (e.g., DNS) change, an indication of an Internet protocol (e.g., IP) change, or an indication of a Regional Internet Registry (RIR) change, an indication of a company merger, acquisition or divestiture, an indication of a changed system, an indication of a changed service, the public release or disclosure of a 'zero-day' vulnerability or severe threat for existing operating code, a limited private release or disclosure of a 'zero-day' vulnerability or severe threat for existing operating code, or any other appropriate automatic indication. In various embodiments, the indication comprises an indication of one or more addresses (e.g., addresses where a change as occurred, addresses causing a problem, addresses experiencing unusual behavior, etc.), one or more ports (e.g., ports that require scanning, ports associated with services that require scanning, etc.), one or more scan types (e.g., scan types associated with a service that requires scanning), or any other appropriate scan information. In 402, a scanning query is determined based at least in part on the indication. For example, in the case of a changed BGP route advertisement, all IP addresses across a priority list of ports in the changed advertised prefixes could be chosen for high priority scanning. In the case of a merger between network appliance manufacturers, all IPs associated with the companies themselves and the IPs their products are detected on are automatically re-scanned. In the case of a limited private disclosure of a 'zero-day' vulnerability, all IPs associated with systems that are potentially vulnerable to the zero-day are automatically rescanned with specific parameters to test if they are in fact vulnerable to the zero-day. In various embodiments, a scanning query is based at least in part on an address associated with the indication, on a port associated with the indication, on a scan type associated with the indication, or on any other appropriate indication information. In some embodiments, determining the scanning query based at least in part on the indication comprises expanding the query (e.g., expanding the query to include scanning additional addresses, additional ports, or using additional scan types past what is indicated directly in the indication). For example, if a new company is formed by the merger of two or more other companies, IPs which have a domain associated with the new company are automatically scanned across a given list of ports and protocols. In the case of a public zero-day vulnerability, the set of addresses to be rescanned are recursively triggered—for example, first the set of IPs potentially vulnerable to the zero-day are scanned, follow by an expanded query for those IP addresses that share a public cryptographic key with an IP found to be vulnerable to the zero-day. In 404, the scanning query is performed (e.g., one or more systems are scanned as indicated by the scanning query). In 406, a query result is stored. For example, the results of the scanning query are stored in a database. The database stores query results over time so that a comparison can be made between results of scans at different times. In 408, a network status display is provided. In some embodiments, the network status display comprises a display of network vulnerabilities. In some embodiments, the network status display comprises a comparison of scan data with historical data.

Figure 5:
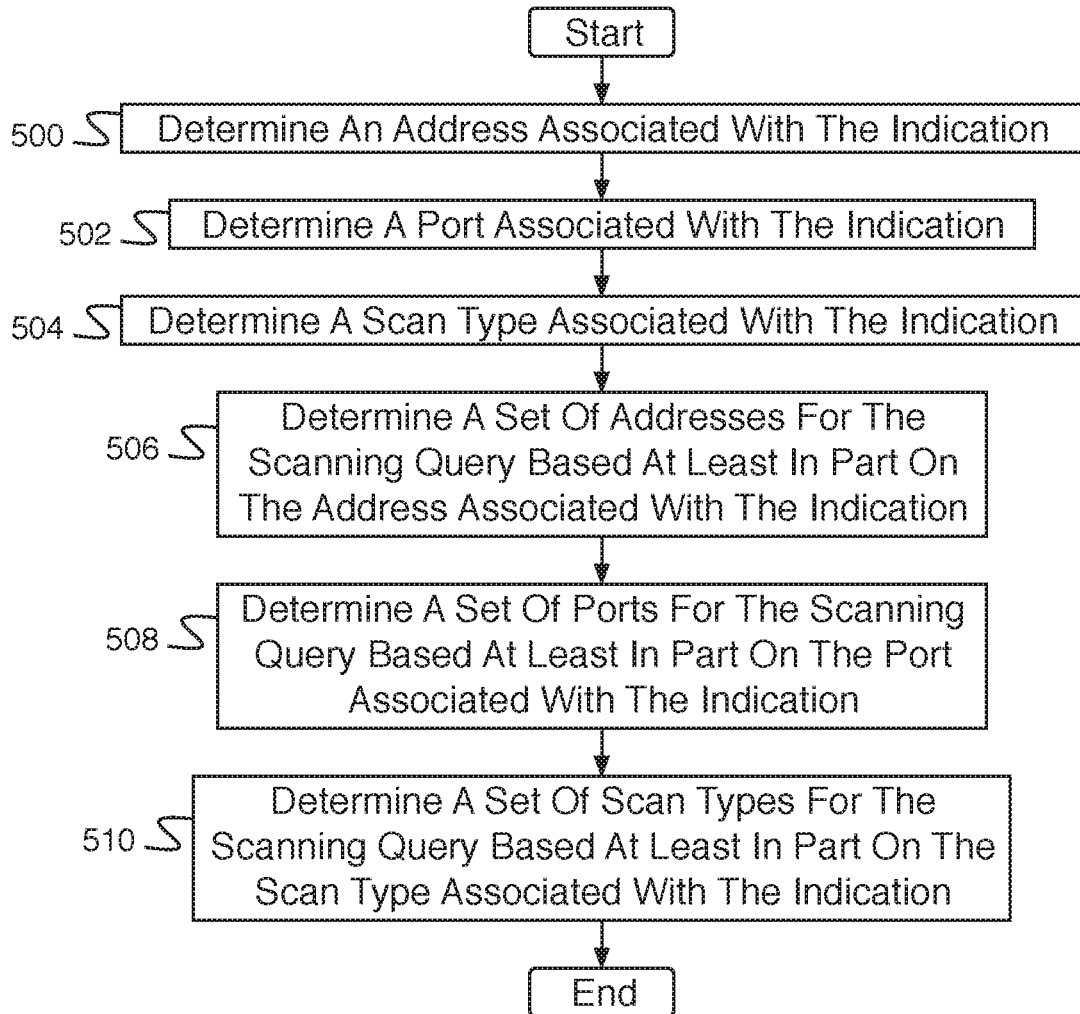
FIG. 5 is a flow diagram illustrating an embodiment of a process for determining a scanning query based at least in part on an indication.

FIG. 5 is a flow diagram illustrating an embodiment of a process for determining a scanning query based at least in part on an indication. In some embodiments, the process of FIG. 5 implements 402 of FIG. 4. In the example shown, in 500, an address associated with the indication is determined. In various embodiments, an address associated with an indication comprises an address of a modified system, an address of a system with a problem, an address of a system under attack, an address of a system receiving unusual traffic, an address of a system creating unusual traffic, an address of a system associated with a malware indication, or any other appropriate address. In 502, a port associated with the indication is determined. In various embodiments, a port associated with the indication comprises a port indicated to be modified (e.g., a newly closed port, a newly opened port, etc.), a port associated with a service having a problem, a port determined to be under attack, a port receiving unusual traffic, a port creating unusual traffic, or any other appropriate port. In 504, a scan type associated with the indication is determined. In various embodiments, a scan type comprises a scan type associated with an indicated change, a scan type associated with an indicated service, a broad scan type, a scan type for identifying malware, a scan type for determining a system extent, or any other appropriate scan type. In 506, a set of addresses for the scanning query are determined based at least in part on the address associated with the indication. In some embodiments, the set of address for the scanning query comprises the address associated with the indication and other addresses. In various embodiments, the set of addresses for the scanning query comprises a set of addresses nearby the address associated with the indication, a set of addresses on the same network as the address associated with the indication, a set of addresses configured in the same way as the address associated with the indication, or any other appropriate set of addresses. In 508, a set of ports for the scanning query based at least in part on the port associated with the indication is determined. In some embodiments, the set of ports for the scanning query comprises the port associated with indication and other ports. In various embodiments, the set of ports for the scanning query comprises a set of ports associated with the port associated with the indication, a set of ports nearby to the port associated with the indication, a set of ports associated with the indication, or any other appropriate set of ports. In 510, a set of scan types for the scanning query based at least in part on the scan type associated with the indication is determined. In some embodiments, the set of scan types for the scanning query comprises the scan type associated with indication and other scan type. In various embodiments, the set of scan types for the scanning query comprises a set of scan types associated with the port associated with the indication, a set of scan types similar to the scan type associated with the indication, a set of scan types associated with the indication, or any other appropriate set of scan types.

Figure 6:
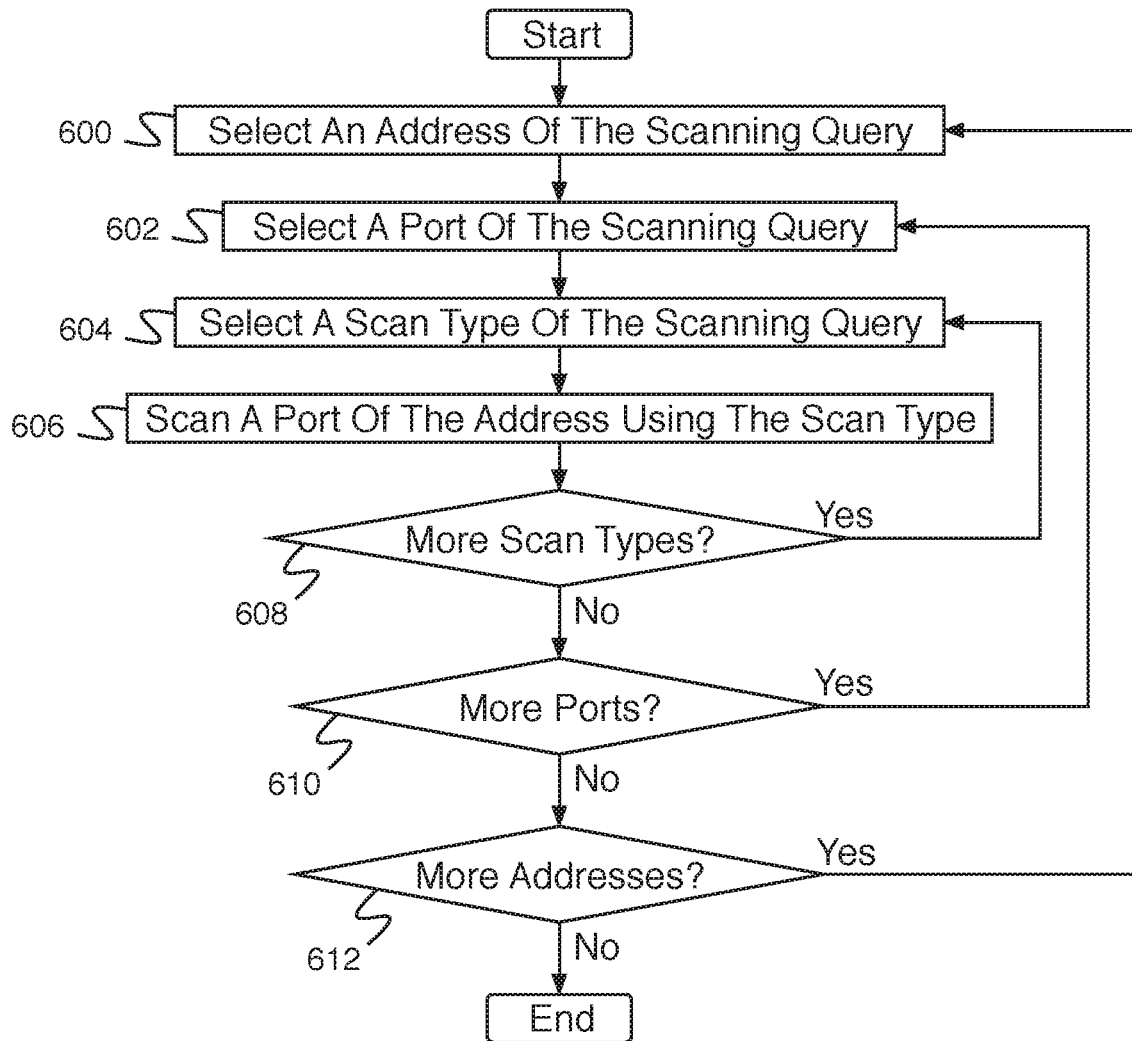
FIG. 6 is a flow diagram illustrating an embodiment of a process for performing a scanning query.

FIG. 6 is a flow diagram illustrating an embodiment of a process for performing a scanning query. In some embodiments, the process of FIG. 6 implements 404 of FIG. 4. In the example shown, in 600, an address of the scanning query is selected. In various embodiments, the address comprises a first address, a next address, a randomly selected address, a pseudorandomly selected address, or any other appropriate address. In 602, a port of the scanning query is selected. In various embodiments, the port comprises a first port, a next port, a randomly selected port, a pseudorandomly selected port, or any other appropriate port. In 604, a scan type of the scanning query is selected. In various embodiments, the scan type comprises a first scan type, a next scan type, a randomly selected scan type, a pseudorandomly selected scan type, or any other appropriate scan type. In 606, a port of the address is scanned using the scan type. In some embodiments, the scan type comprises a hierarchical scan and comprises scanning using a follow-up probe in the event the scan response indicates scanning using a follow-up probe. In various embodiments, the scan type comprises any appropriate number of communications involving the port of the address, other ports, other addresses, or any other appropriate scan targets. In 608, it is determined whether there are more scan types (e.g., more scan types of the scanning query to scan the port on the address with). In the event it is determined that there are more scan types, control passes to 604. In the event it is determined that there are not more scan types, control passes to 610. In 610, it is determined whether there are more ports (e.g., of the scanning query on the address to scan). In the event it is determined that there are more ports, control passes to 602. In the event it is determined that there are not more ports, control passes to 612. In 612, it is determined whether there are more addresses (e.g., of the scanning query). In the event it is determined that there are more addresses, control passes to 600. In the event it is determined that there are not more addresses, the process ends.

Figure 7:
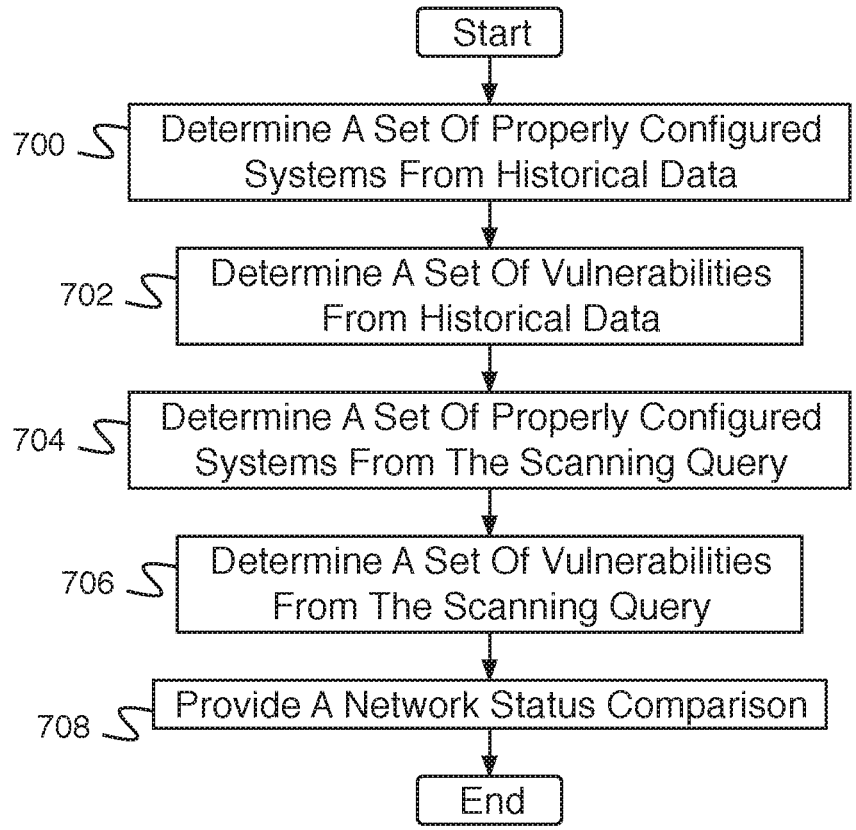
FIG. 7 is a flow diagram illustrating an embodiment of a process for providing a network status display.

FIG. 7 is a flow diagram illustrating an embodiment of a process for providing a network status display. In some embodiments, the process of FIG. 7 implements 408 of FIG. 4. In the example shown, in 700, a set of properly configured systems is determined from historical data. In some embodiments, historical data comprises a previous scan. In some embodiments, properly configured systems comprise systems without detected vulnerabilities. In various embodiments, the set of properly configured systems comprises a subset of a client network, a subset of addresses of the scanning query, all properly configured systems, or any other appropriate set of properly configured systems. In 702, a set of vulnerabilities is determined from historical data. In various embodiments, vulnerabilities comprise misconfigured systems, systems accessible that should not be accessible, vulnerabilities to a newly discovered system exploit, or any other appropriate vulnerabilities. In 704, a set of properly configured systems are determined from the scanning query (e.g., from the most recent scan data). In 706, a set of vulnerabilities is determined from the scanning query. In 708, a network status comparison is provided. In some embodiments, the network status comparison comprises a comparison of a network status before and after an indication was received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an event driven query, comprising:
an input interface configured to:
receive an indication of change from a set of networks comprising Internet accessible external systems; and
a processor configured to:
determine a scanning query based at least in part on the indication;
perform the scanning query, wherein performing the scanning query comprises scanning within said set of networks each Internet accessible external system by providing a payload to all accessible network systems on all accessible ports of each Internet accessible external system and determining whether a response is received and further comprises scanning each network system using a follow-up probe based at least in part on a received response; and
provide a network status display, wherein the network status display comprises a comparison of a network status before and after the indication was received comprising Internet accessible external systems without detected vulnerabilities before the indication was received, historical vulnerabilities Internet accessible external systems without detected vulnerabilities determined from the scan, and vulnerabilities determined from the scan, wherein vulnerabilities comprise misconfigured Internet accessible external systems, Internet accessible external systems accessible that should not be accessible, and vulnerabilities to a newly discovered Internet accessible external system exploit.

2. The system of claim 1, wherein the indication comprises a manually determined indication.

3. The system of claim 2, wherein the indication comprises a vulnerability indication.

4. The system of claim 2, wherein the indication comprises a published news story indication determined from a published news story.

5. The system of claim 2, wherein the indication comprises an internet posting indication determined from an Internet posting.

6. The system of claim 1, wherein the indication comprises an automatic indication.

7. The system of claim 6, wherein the indication comprises a broader gateway protocol (BGP) route change indication.

8. The system of claim 6, wherein the indication comprises a domain name system (DNS) change indication.

9. The system of claim 6, wherein the indication comprises an Internet protocol (IP) change indication.

10. The system of claim 1, wherein determining the scanning query comprises determining an address associated with the indication.

11. The system of claim 1, wherein determining the scanning query comprises determining a port associated with the indication.

12. The system of claim 1, wherein determining the scanning query comprises determining a scan type associated with the indication.

13. The system of claim 1, wherein determining the scanning query comprises expanding the scanning query.

14. The system of claim 13, wherein expanding the scanning query comprises adding addresses to the scanning query.

15. The system of claim 13, wherein expanding the scanning query comprises adding ports to the scanning query.

16. The system of claim 13, wherein expanding the scanning query comprises adding scan types to the scanning query.

17. The system of claim 1, wherein performing the scanning query comprises scanning one or more address of a client system at one or more ports using one or more scan types.

18. A method for an event driven query, comprising:
receiving an indication of change from a set of networks comprising Internet accessible external systems;
determining, using a processor, a scanning query based at least in part on the indication;
performing the scanning query, wherein performing the scanning query comprises scanning within said set of networks each Internet accessible external system by providing a payload to all accessible network systems on all accessible ports of each Internet accessible external system and determining whether a response is received and further comprises scanning each network system using a follow-up probe based at least in part on a received response; and
providing a network status display, wherein the network status display comprises a comparison of a network status before and after the indication was received comprising Internet accessible external systems without detected vulnerabilities before the indication was received, historical vulnerabilities, Internet accessible external systems without detected vulnerabilities determined from the scan, and vulnerabilities determined from the scan, wherein vulnerabilities comprise misconfigured Internet accessible external systems, Internet accessible external systems accessible that should not be accessible, and vulnerabilities to a newly discovered Internet accessible external system exploit.

19. A computer program product for an event driven query, the computer program product being embodied in a non-transitory computer readable storage medium and comprising computer instructions for:
receiving an indication of change from a set of networks comprising Internet accessible external systems;
determining a scanning query based at least in part on the indication;
performing the scanning query, wherein performing the scanning query comprises scanning within said set of networks each Internet accessible external system by providing a payload to all accessible network systems on all accessible ports of each Internet accessible external system and determining whether a response is received and further comprises scanning each network system using a follow-up probe based at least in part on a received response; and
providing a network status display, wherein the network status display comprises a comparison of a network status before and after the indication was received comprising Internet accessible external systems without detected vulnerabilities before the indication was received, historical vulnerabilities, Internet accessible external systems without detected vulnerabilities determined from the scan, and vulnerabilities determined from the scan, wherein vulnerabilities comprise misconfigured Internet accessible external systems, Internet accessible external systems accessible that should not be accessible, and vulnerabilities to a newly discovered Internet accessible external system exploit.

* * * * *